US012129699B2

(12) United States Patent
Yun

(10) Patent No.: US 12,129,699 B2
(45) Date of Patent: Oct. 29, 2024

(54) DOOR HINGE DEVICE FOR VEHICLES

(71) Applicants: HYUNDAI MOTOR COMPANY, Seoul (KR); Kia Corporation, Seoul (KR)

(72) Inventor: Hyungin Yun, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 47 days.

(21) Appl. No.: 17/965,404

(22) Filed: Oct. 13, 2022

(65) Prior Publication Data

US 2023/0212896 A1 Jul. 6, 2023

(30) Foreign Application Priority Data

Dec. 30, 2021 (KR) ........................ 10-2021-0193347

(51) Int. Cl.
*E05D 3/06* (2006.01)
*E05D 3/16* (2006.01)

(52) U.S. Cl.
CPC .......... *E05D 3/16* (2013.01); *E05D 2003/166* (2013.01)

(58) Field of Classification Search
CPC ............... E05Y 2900/531; E05D 5/062; E05D 11/1057; E05D 11/105; E05D 11/1064; E05D 11/1071; E05D 3/12; E05D 3/14; E05D 3/16; E05D 3/127; E05D 3/145; E05D 2003/166; E05F 1/1246; E05F 1/1292; E05F 1/1141; E05F 1/1091
See application file for complete search history.

(56) References Cited

U.S. PATENT DOCUMENTS 2,686,332 A * 8/1954 Moon ....................... A47B 1/04 108/81
4,470,170 A * 9/1984 Gerteis ..................... E05D 3/16 16/334
5,058,238 A * 10/1991 Lautenschlager ... E05D 11/1021 16/370
6,308,376 B1 * 10/2001 Koshikawa ............... E05D 3/16 16/370
6,397,434 B1 * 6/2002 Cheal .................... E05F 1/1261 16/370
6,402,270 B1 * 6/2002 Frank ........................ E05D 7/04 16/370

(Continued)

FOREIGN PATENT DOCUMENTS

AU 2017248443 A1 * 5/2018 ............. E05D 11/00
EP 2166185 A1 * 3/2010 ............... E05D 3/16

(Continued)

*Primary Examiner* — Chuck Y Mah
(74) *Attorney, Agent, or Firm* — MORGAN, LEWIS & BOCKIUS LLP

(57) ABSTRACT

In a door hinge device for the vehicle, in the vehicle without a B pillar, the four-section link including the first link formed of the first vehicle body rod and the first door rod that are mutually hinged and the second link formed of the second vehicle body rod and the second door rod that are mutually hinged is applied between the vehicle body bracket and the door bracket fixed to each hinge portion of the vehicle body and the door, it enables the opening/closing operation of the door without a rotational interference with the vehicle body or other door.

10 Claims, 9 Drawing Sheets

(56) References Cited

U.S. PATENT DOCUMENTS

| | | | | |
|---|---|---|---|---|
| 7,197,790 | B1 * | 4/2007 | Edmondson | E05F 1/1292 16/370 |
| 7,350,273 | B1 * | 4/2008 | Skipper | E05D 3/16 16/369 |
| 7,814,617 | B2 * | 10/2010 | Frank | E05D 7/06 16/366 |
| 9,810,476 | B2 * | 11/2017 | Kim | E05D 7/04 |
| 10,648,210 | B1 * | 5/2020 | Targhi | E05D 3/18 |
| 11,377,192 | B2 * | 7/2022 | Heeren | E05D 15/32 |
| 2005/0173943 | A1 * | 8/2005 | Duffy | E05D 11/06 296/146.12 |
| 2009/0271949 | A1 * | 11/2009 | Sprague | E05D 5/062 16/382 |
| 2011/0198883 | A1 * | 8/2011 | Heuel | E05D 15/101 296/149 |
| 2016/0362920 | A1 * | 12/2016 | Dey | E05D 3/127 |

FOREIGN PATENT DOCUMENTS

| | | | | |
|---|---|---|---|---|
| EP | 1882073 | B1 * | 11/2020 | E05D 3/16 |
| KR | 101104392 | B1 * | 1/2012 | |
| KR | 10-2019-0028966 | A | 3/2019 | |

* cited by examiner

DOOR HINGE DEVICE FOR VEHICLES

CROSS-REFERENCE TO RELATED APPLICATION

The present application claims priority to Korean Patent Application No. 10-2021-0193347 filed on Dec. 30, 2021, the entire contents of which is incorporated herein for all purposes by this reference.

BACKGROUND OF THE PRESENT DISCLOSURE

Field of the Present Disclosure

The present disclosure relates to a door hinge device for a vehicle. More particularly, the present disclosure relates to a door hinge device for a vehicle that enables an opening/closing operation of each door independently by securing a rotation trajectory while moving a hinge part of a door to an outside of a vehicle body in a vehicle without a B pillar.

Description of Related Art

In general, a vehicle door as a door that separates the inside and outside of the vehicle blocks external noise, rain, dust, wind, etc., and has an important function of absorbing an impact together with the side structure to safely protect occupants in an event of a side collision.

There are various types of vehicle doors, including special-purpose doors, but swing doors of a hinge-type are most often applied to passenger vehicles.

In general, the swing door refers to a door that opens to the outside of the vehicle body around a hinge axis provided to the vehicle body through a hinge bracket interposed therebetween, and has advantages of easy opening and closing and a simple structure, so maintenance and repair are easy.

On the other hand, in some vehicles, when the door is opened, an open feeling is large, and an opposing swing door is applied, which is advantageous for getting the passengers on or off.

These opposing swing doors are divided into a type without a B pillar and a type with a B pillar.

FIG. 1 is a side view showing a vehicle to which an opposing swing door according to an example of related art is applied, and FIG. 2 is a cross-sectional view showing a part where a front door and a rear door are in contact in the vehicle of FIG. 1.

First, referring to FIG. 1 and FIG. 2, an example of the opposing swing door applied to the vehicle 100 without the B pillar is shown. In the front door 110, the hinge portion is provided at the front end portion of the front door 110, and in the rear door 120, the hinge portion is provided at the rear end portion of the rear door 120.

In the present opposing swing door, a latch portion LC is provided on one side of the front door 110 or the rear door 120 to maintain the locked state.

Furthermore, a seal S for air-tightness is provided between the rear end portion of the front door 110 and the front end portion of the rear door 120.

As described above, the opposing swing door of the vehicle 100 without the B pillar has a good open feeling when riding or leaving the vehicle or leisure activities, however during the opening and closing operation of the front door 110 and the rear door 120, there is a drawback in that the opening and closing order is predetermined, such as having to open or close the front door 110 first or later due to the overlapping rotation trajectory between the front door 110 and the rear door 120.

Accordingly, because the opening and closing order of the front door 110 and the rear door 120 is predetermined, there is a problem that the rear door 120 cannot be opened or closed alone.

FIG. 3 is a side view showing a vehicle to which an opposing swing door according to another example of a related art is applied, and FIG. 4 is a cross-sectional view showing a part where a front door and a rear door are in contact with each other in a vehicle of FIG. 3.

Referring to FIG. 3 and FIG. 4, an example of the opposing swing door applied to the vehicle 200 with the B pillar 230 is shown. Also, in the front door 210, a hinge portion is provided to the front end portion of the front door 210, and the hinge portion is provided to the rear end portion of the rear door 220 in the rear door 220.

In the present opposing swing door, a latch portion LC is provided between each one side of the front door 210 and the rear door 220, and the B pillar 230 to maintain the locking state.

Furthermore, a seal S for air-tightness is provided between the rear end portion of the front door 210 and the front end portion of the rear door 220, corresponding to the B pillar 230, and the B pillar 230.

Accordingly, because the opposing swing door of the vehicle 100 with the B pillar is configured so that the front door 210 and the rear door 220 rotate with respect to the B pillar 230, each of the independently operation of the opening and closing is possible, which has the advantage of a free operation order, however due to the application of the B pillar 230, there is a problem that the feeling of the openness is reduced when riding or leaving the vehicle or the leisure activities.

Accordingly, there is a difference in the sense of the openness of the opposing swing door and there is a difference in the opening and closing operation of the front door and the rear door depending on the presence or absence of the B pillar.

On the other hand, as described above, to solve the problem of the operation sequence of the front door 110 and the rear door 120 while maintaining the open feeling of the vehicle 100 without the B pillar, conventionally, as the door hinge device of the opposing swing door, there is an example in which the hinge device of a gooseneck type is applied, however the hinge device of the present gooseneck type requires a lot of free space in the vehicle body width direction due to its shape characteristic, so it is difficult to configure the vehicle body layout.

Accordingly, to apply the opposing swing door to the vehicle without the B pillar, a door hinge device for realizing a new opening and closing structure is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door hinge device for a vehicle according to various exemplary embodiments of the present disclosure, in a vehicle without a B pillar, in which a four-section link including a first link formed of a first vehicle body rod and a first door rod that are mutually hinged and a second link formed of a second vehicle body rod and a second door rod that are mutually hinged is applied between a vehicle body bracket and a door bracket fixed to each hinge portion of a vehicle body and door, it enables an opening/closing operation of a door without a rotational interference with a vehicle body or other door.

In one or a plurality of embodiments of the present disclosure, a door hinge device for a vehicle configured in a hinge part of a vehicle body and a door includes: a vehicle body bracket fixed to the hinge portion of the vehicle body; a door bracket fixed to the hinge portion of the door; and a four-section link including a vehicle body rod and a door rod mutually hinged and hinged between the vehicle body bracket and the door bracket with a four-section link structure including a fixing rotation point.

The two link may include: a first link including a first vehicle body rod and a first door rod mutually hinged to each other, wherein a first end portion of the first vehicle body rod is connected to a first side of the vehicle body bracket and a first end portion of the first door rod is connected to a first side of the door bracket; and a second link including a second vehicle body rod and a second door rod mutually hinged to each other, wherein a first end portion of the second vehicle body rod is connected to a second side of the vehicle body bracket, a first end portion of the second door rod is connected to a second side of the door bracket, and the fixing rotation point is formed on each one side of the second vehicle body rod and the first door rod.

In the first and second links, each end portion of the first and second door rods is hinged below each end portion of the first and second vehicle body rods by first and second link pins, respectively.

In the first link, a first end portion of the first vehicle body rod may be hinged to a first side of the vehicle body bracket through a first hinge pin, and a first end portion of the first door rod is hinged to a first side of the door bracket through a second hinge pin.

In the second link, a first end portion of the second vehicle body rod may be hinged to a second side of the vehicle body bracket through a third hinge pin, a first end portion of the third door rod may be hinged to a second side of the door bracket through a fourth hinge pin, and each one side of the second vehicle body rod and the first door rod may be connected by a rotation pin, forming the fixing rotation point.

In the first and second links, the first vehicle body rod and the first door rod may be disposed close to the vehicle body side, and the second vehicle body rod and the second door rod may be disposed close to the door side.

In the first and second links, the first vehicle body rod and the second vehicle body rod may be adjacently disposed side by side, and the first door rod and the second door rod may be adjacently disposed side by side thereof.

In the first and second links, each center portion of the first and second vehicle body rods may be bent outward of the vehicle body to form a curved line section.

In the first link, a damper may be configured on one side surface of the first vehicle body rod corresponding to the second vehicle body rod.

The hinge portion of the vehicle body may be one side of the vehicle body corresponding to a front end portion of the front door, or one side of the vehicle body corresponding to a rear end portion of the rear door.

The hinge portion of the door may be one side of the front end portion of the front door, or one side of the rear end portion of the rear door.

In the door hinge device for the vehicle according to various exemplary embodiments of the present disclosure, in the vehicle without a B pillar, the four-section link including the first link formed of the first vehicle body rod and the first door rod that are mutually hinged and the second link 20 formed of the second vehicle body rod and the second door rod that are mutually hinged are operated with two four-section link structures including one fixing rotation point between the vehicle body bracket and the door bracket fixed to each hinge portion of the vehicle body and the door, it enables the opening/closing operation of the door without rotational interference with the vehicle body or other door.

Accordingly, it is possible to simultaneously to open or close the doors of both sides and to independently to open or close one door.

Furthermore, the door hinge device for the vehicle according to various exemplary embodiments of the present disclosure maintains the advantage of good openness during riding or leaving of passengers or leisure activities in an opposing swing door of a vehicle without a B pillar, and the door opening/closing sequence is not affected even during the opening/closing operation of each door.

Furthermore, because the user manually opens or closes the door without a separate driving unit using a motor, it is possible to enable the door opening/closing operation even when the battery is discharged.

Furthermore, the door hinge device for the vehicle according to various exemplary embodiments of the present disclosure is slim compared to use of a driving unit such as a conventional motor or a gooseneck type of hinge device, and does not require a free space according to the operation radius, there is also an advantage in the vehicle body layout configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
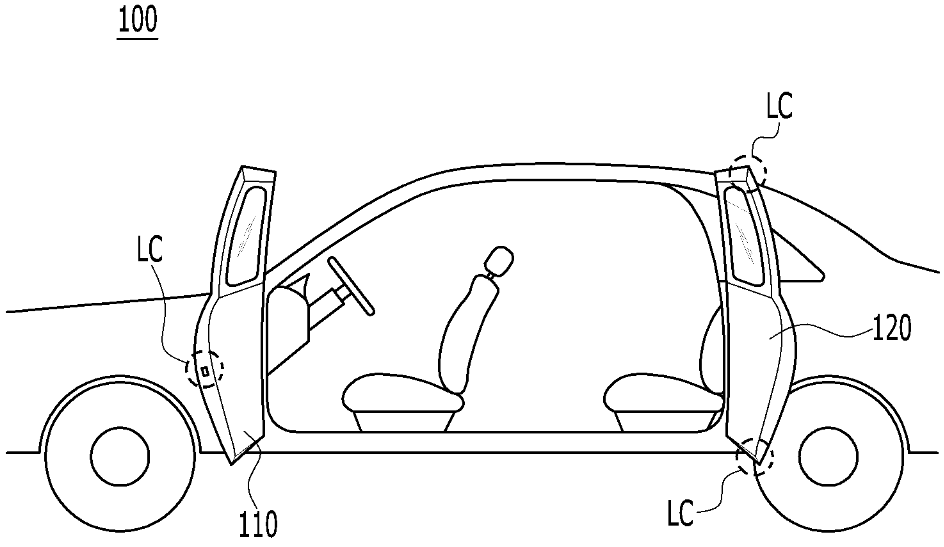
FIG. 1 is a side view showing a vehicle to which an opposing swing door according to an example of related art is applied.
Figure 2:
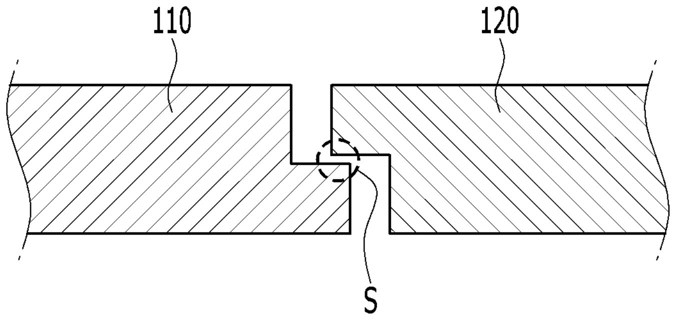
FIG. 2 a cross-sectional view showing a part where a front door and a rear door are in contact in the vehicle of FIG. 1.
Figure 3:
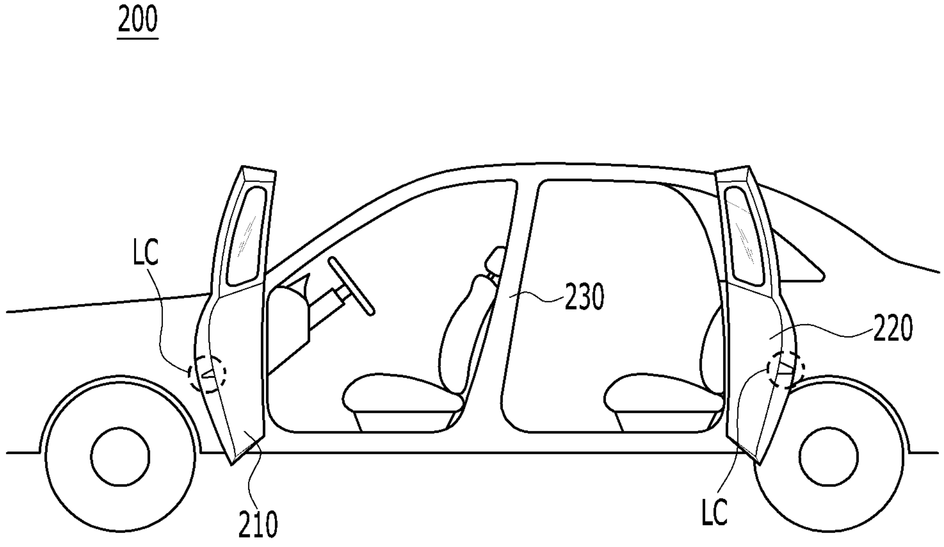
FIG. 3 is a side view showing a vehicle to which an opposing swing door according to another example of a related art is applied.
Figure 4:
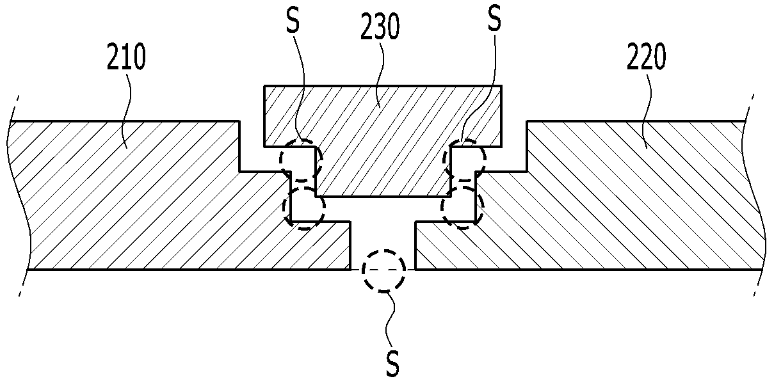
FIG. 4 is a cross-sectional view showing a part where a front door and a rear door are in contact with each other in a vehicle of FIG. 3.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail with reference to the accompanying drawings.

However, since the size and thickness of each component shown in the drawing are arbitrarily indicated for convenience of explanation, the present disclosure is not necessarily limited to as shown in the drawing, and the thickness is enlarged or reduced in order to clearly express various parts and regions. Furthermore, in order to clearly describe various exemplary embodiments of the present disclosure, parts that are irrelevant to the description are omitted.

Figure 5:
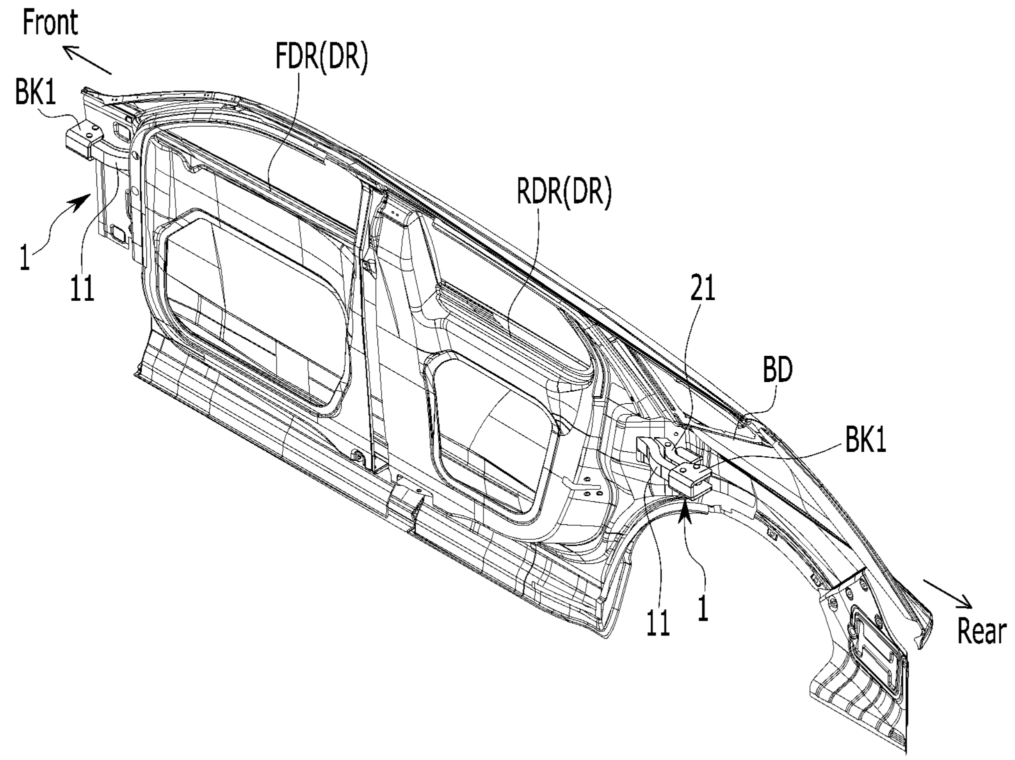
FIG. 5 is an inside perspective view of a vehicle door to which a door hinge device for a vehicle according to various exemplary embodiments of the present disclosure is applied.

In describing various exemplary embodiments of the present disclosure, for convenience of explanation, an upper left direction in FIG. 5 is defined as the front, and the lower right direction is defined as the rear. Furthermore, an example in which a door hinge device for a vehicle according to various exemplary embodiments of the present disclosure is applied to a rear door of a rear of a passenger seat is described.

Figure 6:
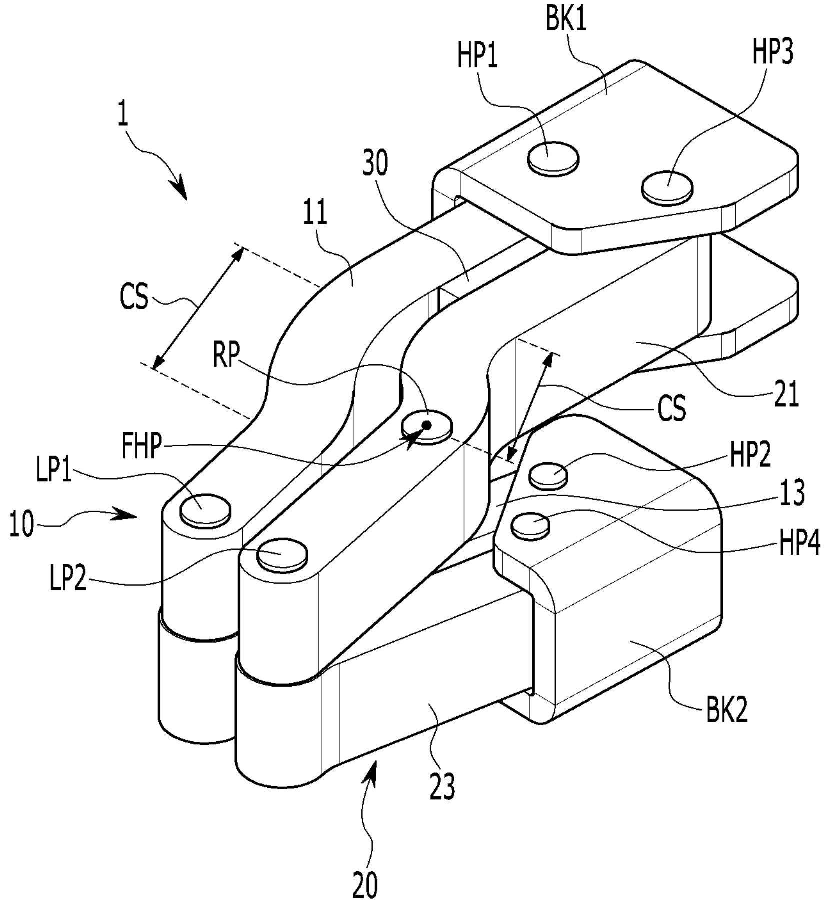
FIG. 6 is a perspective view of a door hinge device for a vehicle according to various exemplary embodiments of the present disclosure.

FIG. 5 is an inside perspective view of a vehicle door to which a door hinge device for a vehicle according to various exemplary embodiments of the present disclosure is applied, and FIG. 6 is a perspective view of a door hinge device for a vehicle according to various exemplary embodiments of the present disclosure.

Referring to FIG. 5, the door hinge device for the vehicle 1 according to various exemplary embodiments of the present disclosure is referred to as an example applied to the rear door of the rear of the passenger seat of the passenger vehicle without a B pillar, however it is not limited thereto, and it may also be applied to each hinge portion between the front door FDR and the vehicle body BD on both sides of the passenger vehicle without the B pillar, and between the rear door RDR and the vehicle body BD on both sides.

That is, during the opening/closing operation of the door, the front door FDR or the rear door RDR moves to the outside of the vehicle body BD in each diagonal direction of the front of the vehicle body BD or the rear of the vehicle body BD to secure the rotation trajectory of each door, achieving the swing operation, and accordingly, it enables simultaneous the opening/closing operation of both doors or independently for the opening/closing operation of one door.

Here, the door DR may be a front door FDR or a rear door RDR, and may refer thereto simultaneously. That is, in the case of the front door FDR, the hinge portion may be one side of the front end portion of the front door FDR, and in the case of the rear door RDR, the hinge portion may be one side of the rear end portion of the rear door RDR.

Also, one side of the vehicle body BD to which the front door FDR is provided means one side of the front of the vehicle body BD, and in the instant case, the front door FDR may be provided toward the front outside of the vehicle body BD to be opened by the swing operation.

Furthermore, one side of the vehicle body BD on which the rear door RDR is provided means one side of the rear of the vehicle body BD, and in the instant case, the rear door RDR may be provided toward the rear outside of the vehicle body BD to be opened by the swing operation.

Referring to FIG. 6, a door hinge device for a vehicle 1 according to various exemplary embodiments of the present disclosure may include a vehicle body bracket BK1, a door bracket BK2, and a 4-section link device including first and second links 10 and 20.

The vehicle body bracket BK1 is fixed to the hinge portion of the vehicle body BD.

Also, the door bracket BK2 is fixed to the hinge portion of door DR.

Here, the vehicle body bracket BK1 and door bracket BK2 may use a joining technology such as bolt assembly or welding for each hinge portion of the vehicle body BD and the door DR, respectively, when using the joining technique, first, the vehicle body bracket BK1 and the door bracket BK2 are jointed to each hinge portion of the vehicle body BD and the door DR, respectively, and then the four-section link including the first and second links 10 and 20 may be joined to each bracket with hinge pins to be assembled.

Also, the first and second links 10 and 20 may include vehicle body rods 11 and 21 and door rods 13 and 23 each hinged to each other, and be hinged by two four-section links including one fixing rotation point FHP between the vehicle body bracket BK1 and the door bracket BK2, respectively.

That is, the first link 10 includes a first vehicle body rod 11 and a first door rod 13.

The front end portion of the first vehicle body rod 11 is hingedly connected to one side of the vehicle body bracket BK1 with a first hinge pin HP1, and the front end portion of the first door rod 13 is hingedly connected to one side of the door bracket BK2 with a second hinge pin HP2. Furthermore, each end portion of the first vehicle body rod 11 and the first door rod 13 is hinged to a first link pin LP1 to form a two-section link structure.

And the second link 20 includes a second vehicle body rod 21 and a second door rod 23.

The front end portion of the second vehicle body rod 21 is hinged to the other side of the vehicle body bracket BK1 with a third hinge pin HP3, and the front end portion of the second door rod 23 is hinged to the other side of the door bracket BK2 with a fourth hinge pin HP4. Furthermore, each end portion of the second vehicle body rod 21 and the second door rod 23 is hinged to a second link pin LP2 to form a two-section link structure.

Here, each one side of the second vehicle body rod 21 and the first door rod 13 is connected to a rotation pin RP to form a fixing rotation point FHP.

Accordingly, the first and second links 10 and 20 have two four-section link structures including one fixing rotation point FHP together with four hinge pins HP1, HP2, HP3, and HP4 on the vehicle body bracket BK1 and the door bracket BK2 through four rods of the first vehicle body rod 11 and the first door rod 13, and the second vehicle body rod 21 and the second door rod 23 that are hinged-connected to each other by the first and second link pins LP1 and LP2.

Furthermore, the first and second links 10 and 20 are hinged to the first and second link pins LP1 and LP2 in a state in which each end portion of the first and second door rods 13 and 23 is disposed below each end portion of the first and second vehicle body rods 11 and 21.

Also, in the first and second links 10 and 20, the first vehicle body rod 11 and the first door rod 13 are disposed close to the vehicle body BD side, the second vehicle body rod 21 and the second door rod 23 are disposed close to the door DR side, the first and second vehicle body rods 11 and 21 are disposed adjacent to each other and side by side, and the first and second door rods 13 and 23 are disposed adjacent to each other and side by side thereof.

Furthermore, each center portion of the first and second vehicle body rods 11 and 21 is bent from the vehicle body BD side to the door DR side toward the outside of the vehicle body, forming a curved line section CS.

That is, the curvature amount of each curved line section CS of the first and second vehicle body rods 11 and 21 may be determined within the range which may secure the maximum open amount of the door DR without interfering with the vehicle body BD.

Also, the first link 10 is configured with a damper 30 on one side surface of the first vehicle body rod 11 corresponding to the second vehicle body rod 21 to absorb the impact that occurs when closing the door DR, and to help the pop-up of the door DR with the repulsive force of the damper 30 when opening the door DR, so that the user may easily open the door DR.

In various exemplary embodiments of the present disclosure, an example of configuring the damper 30 to the first vehicle body rod 11 has been presented, but is not limited thereto, and it may be applied to any position that can implement the impact absorption function and the pop-up auxiliary function of the door as described above when opening/closing the second vehicle body rod 21 or the door DR.

Furthermore, the damper 30 may be made of a rubber material, but is not limited thereto, and an elastic member such as a spring may be applied.

Hereinafter, the detailed operation of the door hinge device for the vehicle according to various exemplary embodiments of the present disclosure is described with reference to FIG. 7, FIG. 8, and FIG. 9.

Figure 7:
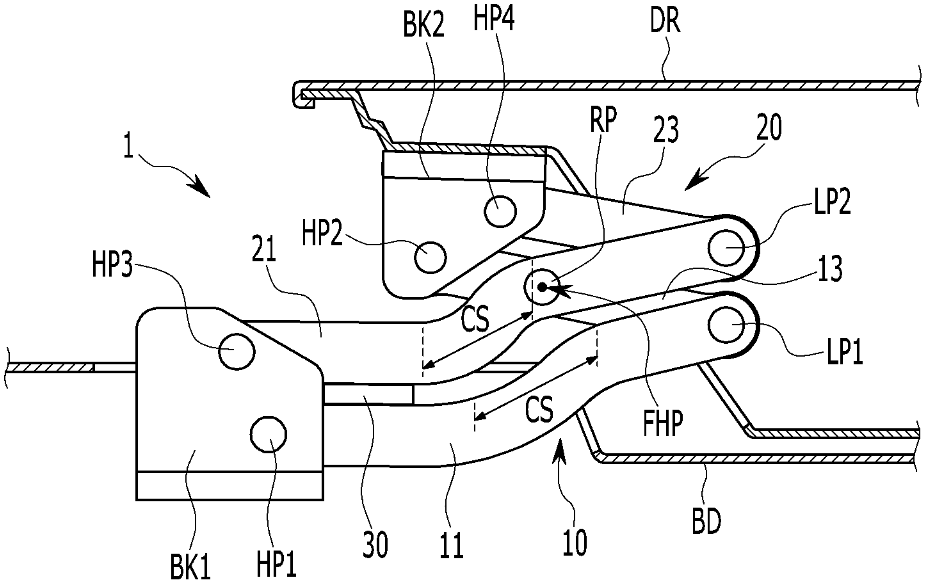
FIG. 7, FIG. 8, and FIG. 9 are flat cross-sectional views showing a step-by-step operation state of a door hinge device for a vehicle according to various exemplary embodiments of the present disclosure.
Figure 8:
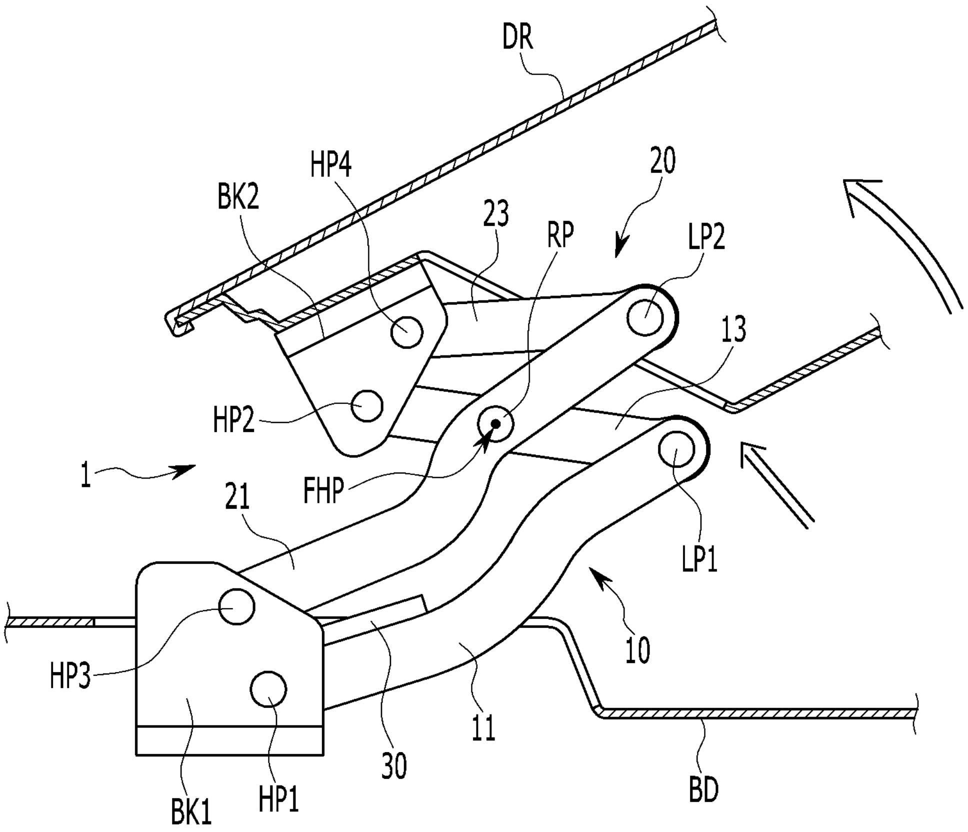
Figure 9:
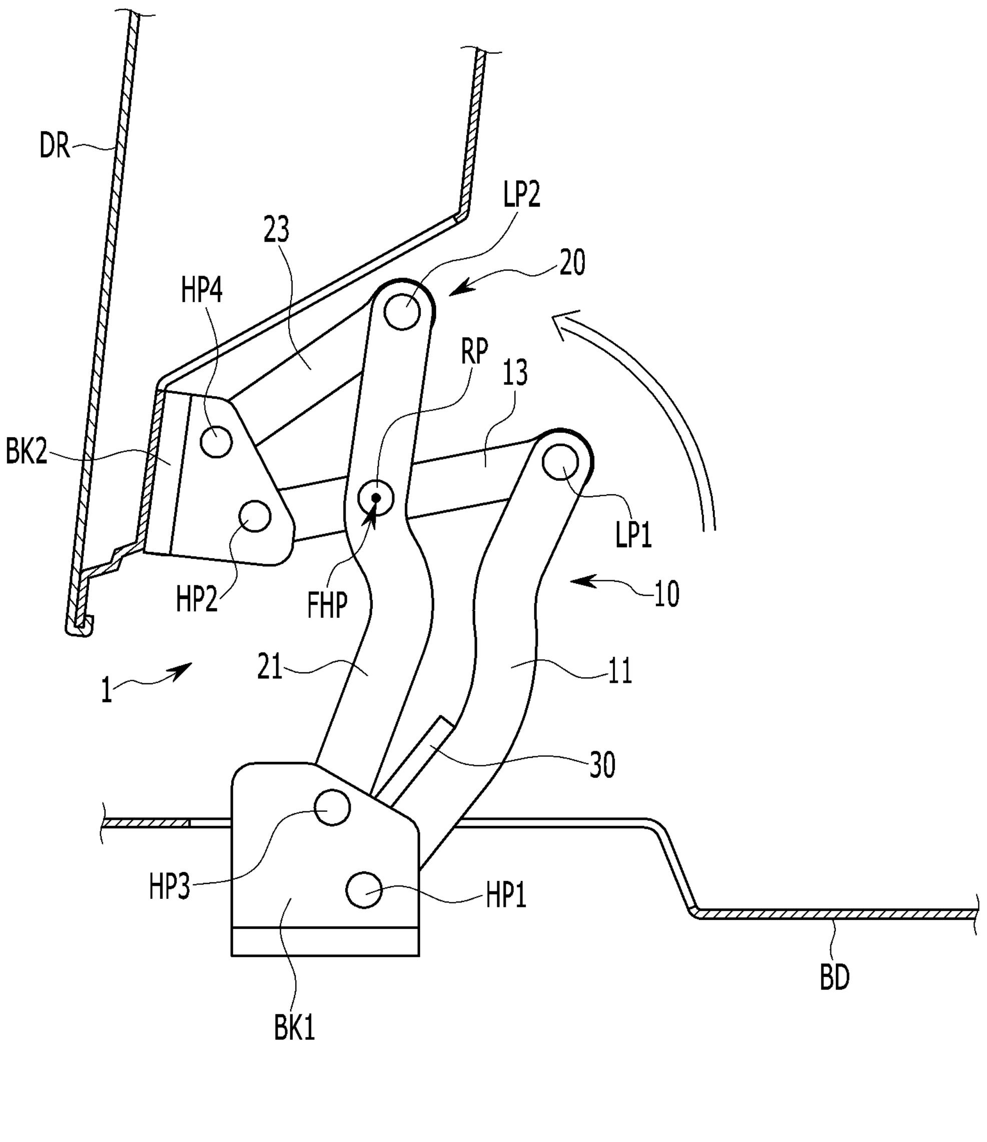

FIG. 7, FIG. 8, and FIG. 9 are flat cross-sectional views showing a step-by-step operation state of a door hinge device for a vehicle according to various exemplary embodiments of the present disclosure.

First, referring to FIG. 7, the door DR is a closed state.

At the present time, in the first and second links 10 and 20 connecting the door DR and the vehicle body BD, the first and second vehicle body rods 11 and 21 are disposed side by side adjacent to each other, and the first and second door rods 13 and 23 are also disposed side by side adjacent to each other.

Referring to FIG. 8, when the door DR is opened by the user by the swinging operation, the hinge portion of the door DR is opened while moving in the external diagonal direction of the vehicle body BD.

At the present time, the first and second links 10 and 20 connecting the door DR and the vehicle body BD are hinge-operated while the interval between the second vehicle body rod 21 and the first vehicle body rod 11 increases according to the position of the fixing rotation point FHP with the first door rod 21.

Referring to FIG. 9, the door DR swings by the user and is in a completely opened state.

In the instant case, in the first and second links 10 and 20 connecting the door DR and the vehicle body BD, one four-section link connecting the first and third hinge pins HP1 and HP3 and the rotation pins RP and the first link pin LP1, and another four-section link connecting the second and fourth hinge pins HP2 and HP4, and the rotation pin RP and the second link pin LP2 are operated with two four-section link structure by use of the rotation pin RP as the fixing rotation point FHP, obtaining the opening/closing operation of the door DR.

Therefore, in the door hinge device for the vehicle 1 according to various exemplary embodiments of the present disclosure, in the vehicle without a B pillar, the four-section link including the first link 10 formed of the first vehicle body rod 11 and the first door rod 13 that are mutually hinged and the second link 20 formed of the second vehicle body rod 21 and the second door rod 23 that are mutually hinged is applied between the vehicle body bracket BK1 and the door bracket BK2 fixed to each hinge portion of the vehicle body BD and the door DR to be operated with two four-section link structures including one fixing rotation point FHP, it enables the opening/closing operation of the door DR without rotational interference with the vehicle body BD or the other door DR.

Accordingly, it is possible to simultaneously to open or close the doors DR of both sides and to independently to open or close one door DR.

Furthermore, the door hinge device for the vehicle 1 according to various exemplary embodiments of the present disclosure maintains the advantage of good openness during the riding or leaving of passengers or leisure activities in an opposing swing door of a vehicle without a B pillar, and the door opening/closing sequence is not affected even during the opening/closing operation of each door DR.

Furthermore, by adjusting the position of each hinge pin HP1, HP2, HP3, and HP4 of the first and second links 10 and 20 and the length of the four rods 11, 13, 21, and 23, the door rotation trajectory to the desired trajectory may be set.

Furthermore, because the user manually opens or closes the door DR without a separate driving unit using a motor, it is possible to enable the door opening/closing operation even when the battery is discharged.

Furthermore, the door hinge device for the vehicle 1 according to various exemplary embodiments of the present disclosure is slim compared to use of a driving unit such as a conventional motor or a gooseneck type of hinge device, and does not require a free space according to the operation radius, there is also an advantage in the vehicle body layout configuration.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for a vehicle configured in a hinge portion of a vehicle body and a hinge portion of a door in the vehicle, the door hinge apparatus comprising:

a vehicle body bracket fixed to the hinge portion of the vehicle body;

a door bracket fixed to the hinge portion of the door; and a four-section link wherein the four-section link further includes:

a first link including a first vehicle body rod and a first door rod mutually hinged to each other, wherein a first end portion of the first vehicle body rod is connected to a first side of the vehicle body bracket and a first end portion of the first door rod is connected to a first side of the door bracket, and a second link including a second vehicle body rod and a second door rod mutually hinged to each other, wherein a first end portion of the second vehicle body rod is connected to a second side of the vehicle body bracket, a first end portion of the second door rod is connected to a second side of the door bracket, and a fixing rotation point is formed on a point in which the second vehicle body rod and the first door rod are pivotally coupled, and wherein each center portion of the first and second vehicle body rods is bent outward of the vehicle body to form a curved line section.

2. The door hinge apparatus of claim 1, wherein the four-section link includes the fixing rotation point between a first link structure including the vehicle door bracket, the first vehicle body rod, the first door rod, and the second vehicle body rod, and a second link structure including the door bracket, the first door rod, and the second vehicle body rod, and the second door rod.

3. The door hinge apparatus of claim 1, wherein in the first and second links, second end portions of the first and second door rods are hinged below second end portions of the first and second vehicle body rods by first and second link pins, respectively.

4. The door hinge apparatus of claim 1, wherein in the first link, the first end portion of the first vehicle body rod is hinged to the first side of the vehicle body bracket through a first hinge pin, and the first end portion of the first door rod is hinged to the first side of the door bracket through a second hinge pin.

5. The door hinge apparatus of claim 4, wherein in the second link, the first end portion of the second vehicle body rod is hinged to the second side of the vehicle body bracket through a third hinge pin, the first end portion of the second door rod is hinged to the second side of the door bracket through a fourth hinge pin, and the point in which the second vehicle body rod and the first door rod are pivotally coupled is connected by a rotation pin, forming the fixing rotation point.

6. The door hinge apparatus of claim 1, wherein when the door is closed, in the first and second links, the first vehicle body rod and the first door rod are disposed close to a vehicle body side, and the second vehicle body rod and the second door rod are disposed close to a door side.

7. The door hinge apparatus of claim 1, wherein in the first and second links, the first vehicle body rod and the second vehicle body rod are adjacently disposed side by side, and the first door rod and the second door rod are adjacently disposed side by side thereof.

8. The door hinge apparatus of claim 1, wherein in the first link, a damper is provided on a side surface of the first vehicle body rod corresponding to the second vehicle body rod.

9. The door hinge apparatus of claim 1, wherein the door of the vehicle includes a front door or a rear door, and wherein the hinge portion of the vehicle body is one side of the vehicle body corresponding to a front end portion of the front door, or one side of the vehicle body corresponding to a rear end portion of the rear door.

10. The door hinge apparatus of claim 1, wherein the door of the vehicle includes a front door or a rear door, and wherein the hinge portion of the door is one side of a front end portion of the front door, or one side of a rear end portion of the rear door.

* * * * *